Nov. 23, 1926. 1,608,350

T. S. WALLER

ARMATURE STRIPPING MACHINE

Filed March 21, 1924    2 Sheets-Sheet 1

Inventor
Thomas S. Waller,
By
Attorneys

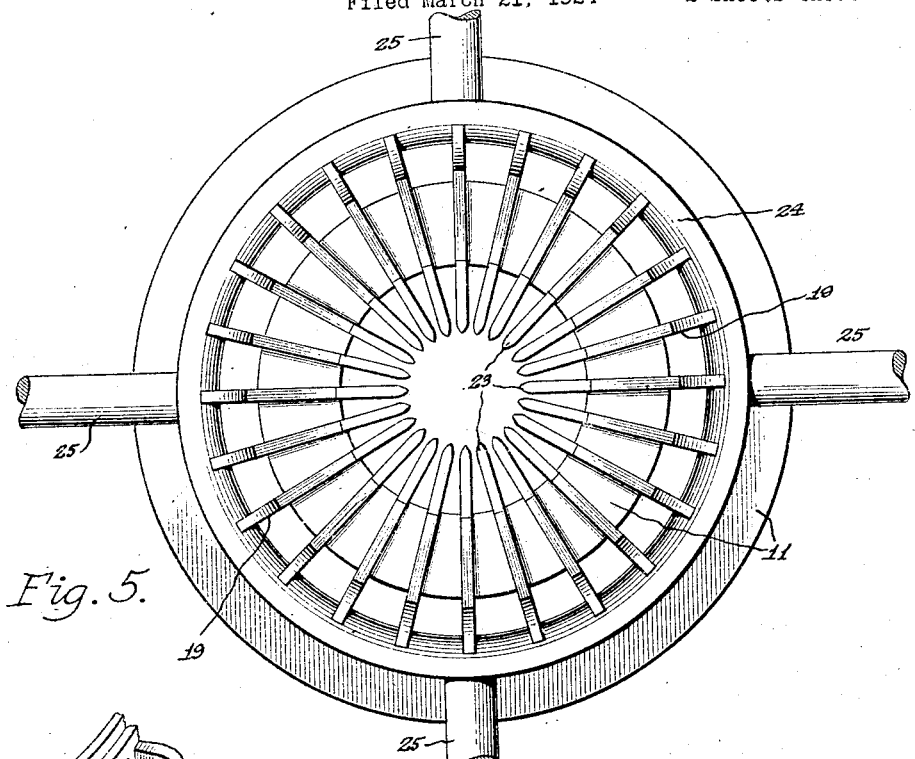
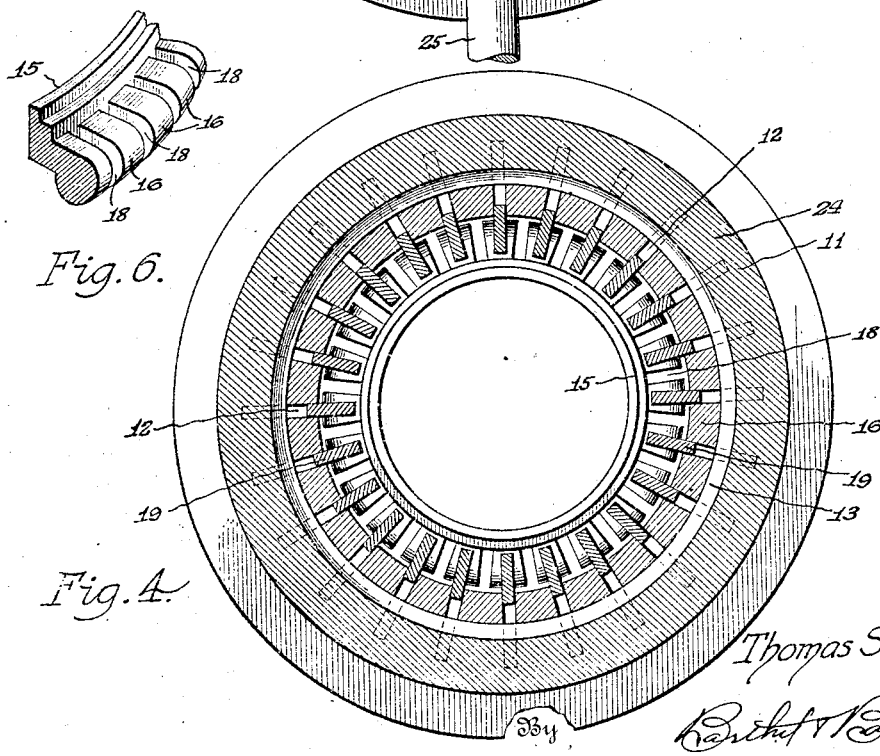

Patented Nov. 23, 1926.

1,608,350

UNITED STATES PATENT OFFICE.

THOMAS S. WALLER, OF DETROIT, MICHIGAN.

ARMATURE-STRIPPING MACHINE.

Application filed March 21, 1924. Serial No. 700,791.

In order to rewind the armatures of electrical machines it is necessary that the old winding be removed and this is a rather tedious and difficult operation on account of the windings being located in narrow slots of the armature and the ends of the windings more or less interwoven.

My invention aims to provide a machine for expeditiously stripping an armature of its winding without injuring the body of the armature, the armature shaft or a commutator thereof. In order that my machine may be used the armature windings are cut and removed adjacent the commutator and then the armature is placed in my machine and the opposite end of the winding held while the body of the armature is forced away from the windings. To accomplish this the machine includes novel fingers for supporting the armature winding so that the body of the armature may be withdrawn, and provision is made for simultaneously adjusting the fingers so as to engage in and support the winding.

The construction entering into my machine will be hereinafter described and then claimed, and reference will now be had to the drawings, wherein—

Fig. 4 is a horizontal sectional view of the machine taken on the line IV—IV of Fig. 1;

Fig. 5 is a plan of the machine, and

Fig. 6 is a detail perspective view of a portion of a finger supporting ring.

Figure 2:
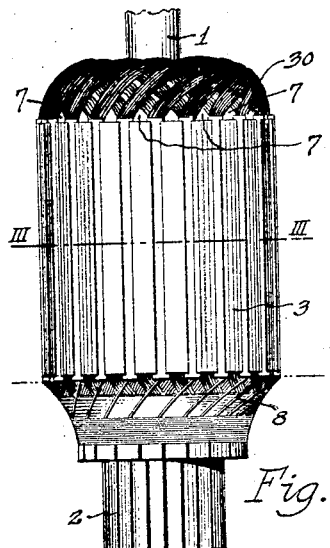
Fig. 2 is a side elevation of an armature.
Figure 3:
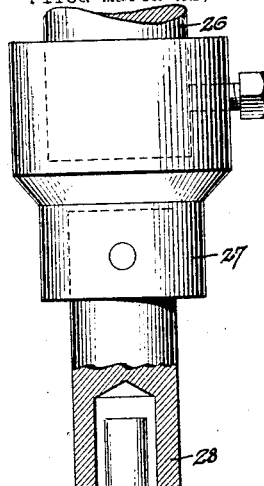
Fig. 3 is a cross sectional view of the armature taken on the line III—III of Fig. 2 with some of the windings removed.
Figure 1:
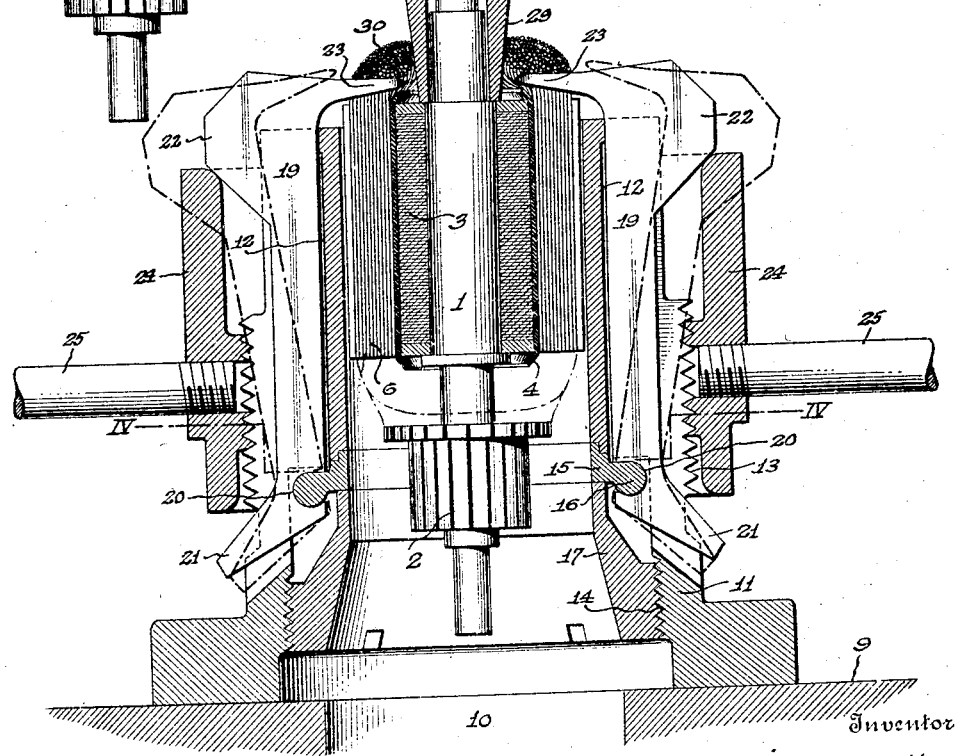
Figure 1 is a vertical sectional view of the machine.

In the drawings, the reference numeral 1 denotes an armature shaft having a commutator 2 and an armature body 3 provided with the usual insulators 4 and longitudinally disposed slots 5 for the windings 6 of the armature. The windings 6 are generally crossed or interwoven at the ends of the body 3 and ordinarily there are interstices 7 which I take advantage of when stripping the armature. The first operation which I perform on the armature is that of cutting and removing the end windings 8 adjacent the commutator thus leaving the windings free so that the commutator body may be shifted co-axially of said windings. To hold the windings while the armature body is shifted, I employ a machine which will now be described.

9 represents a bench or support having an opening 10 and over the opening 10 is mounted a tubular vertically disposed body 11 provided with a series of longitudinally circumferentially disposed grooves 12. The body has an exteriorly screwthreaded enlargement 13 and said body is counter bored and interiorly screwthreaded, as at 14.

Seated in the body 11 is a finger supporting ring 15 which has an annular finger support or fulcrum 16 extending into the counterbored portion of the body 11 and said ring is retained within the body by a sleeve nut 17 in screwthreaded engagement with the screw threads 14 of the body. A spanner wrench or other tool may be employed for screwing the sleeve nut in the body.

A finger support or fulcrum 16 of the ring 15 has slots 18 to facilitate assembling fingers 19 on the support 16. The fingers 19 are placed in the grooves 12 of the body 11 and said fingers are formed with recesses 20 adapted to receive the support or fulcrum 16 of the ring 15. The slots 18 aline with the grooves 12 to permit of the fingers 19 being placed in the grooves and then the ring 15 is circumferentially shifted to place the support or fulcrum in the recess 20 of the fingers, so that said fingers will be fulcrumed or pivotally mounted on the finger ring.

The inner ends of the fingers terminate in angularly disposed end portions 21 and the outer ends of the fingers are formed with cams 22 and prongs 23.

Screwed on the enlargement 13 of the body 11 is a collar or nut 24 having suitable handles 25 by which the collar or nut may be easily rotated. One end of the collar or nut may engage the angular end portions 21 of the fingers to retract the prongs 23 and the opposite end of the collar or nut may engage the cams 22 of the fingers to distend or force the prongs 23 inwardly.

26 denotes a plunger that may form part of an arbor press or any machine by which the plunger 26 may be reciprocated.

Attached to the plunger 26 by a coupling member 27 is a hollow mandrel 28 adapted to receive one end of the armature shaft 1 and the mandrel 28 has a tapered end 29 adapted to extend between the armature shaft 1 and the end windings 30 of the armature and engage the armature body 3. With the mandrel wedged between the end windings 30 and the armature shaft 1 the armature can be held and lowered into the body 11 to such a position that the finger prongs 23 may be forced into the interstices 7 of the end windings. This is accomplished by adjusting the collar or nut 24 to force the prongs 23 into the interstices so that the armature will be suspended, by its end windings 30, in the body 11 of the machine.

Further co-axial movement of the mandrel 28 will force the body 3 from the windings with the armature shaft and its commutator extending through or into the sleeve nut 17 and the opening 10 of the bench 9. As the mandrel 28 passes through the end windings 30 the tapered end 29 of said mandrel will force the windings outwardly so that none of said windings can crowd in between the mandrel 28 and the finger prongs.

After stripping the armature body from the windings the nut or collar 24 may be adjusted to engage the angular end portions 21 of the fingers to retract the prongs 23 and release the armature windings, which may be readily removed from the mandrel.

From the foregoing it will be observed that the circumferential arrangement of the pivoted fingers is such as to fully support the end windings 30 so that the armature body 3 may be dragged from said windings and while such operations can be advantageously performed with the machine in a vertical position, it is obvious that the same can be accomplished when the machine is in a horizontal position possessing the characteristics of a lathe structure.

In practice, and after cutting the end windings 8, said windings may be temporarily left on the armature shaft and withdrawn from the main windings as the armature body is withdrawn. If the windings are such as to not leave the armature shaft after a circumferential cut, a longitudinal cut, either before or after separating the armature and main windings, will facilitate removing the end windings 8.

It will be noted also that my invention involves a method of removing windings from armature bodies, the method consisting in first cutting and removing the winding at one end of the armature body; supporting the armature body by the winding at the opposite end of the armature body, and then causing co-axial movement between said winding and said armature body so that the winding and body are separated. In view of the fact that the method may be carried out other than by the machine herein shown and described, I do not care to limit my invention other than defined by the appended claims.

What I claim is:—

1. Means for removing windings from an armature body from which windings at one end of said armature body have been cut and removed, said means comprising a tubular body, circumferentially disposed fingers pivoted in said body and adapted to engage in the remaining end windings of the armature body, means on said body adapted for engagement with the outer edges of said fingers, to simultaneously shift said fingers, and means supported independent of said body adapted to force the armature body from the windings while held by said fingers.

2. Means for removing windings from an armature body from which windings at one end of said armature body have been cut and removed, said means comprising a tubular body, circumferentially disposed fingers pivoted in said body and adapted to engage in the remaining end windings of the armature body, a collar surrounding said fingers and rotatable on said body adapted for distending and retracting said fingers, and means adapted to force the armature body from the windings while held by said fingers.

3. A machine of the type described comprising a longitudinally slotted screwthreaded body, fingers pivoted in the slots of said body adapted to engage and support an armature winding with an armature body, said fingers having ends protruding from the slots of said body, finger adjusting means on said screwthreaded body adapted for engagement with either of the finger ends, and a mandrel independent of said body and movable into said body adapted to strip the armature body from the armature winding.

4. A machine as called for in claim 3, wherein said finger adjusting means includes a single collar adapted by rotation to engage the ends of said fingers and either distend or retract ends of said fingers.

5. A machine as called for in claim 3, wherein a detachable ring in said body serves as a pivot for all of said fingers.

6. A machine as called for in claim 3, wherein said mandrel has a tapered end adapted to expand the winding as said armature body is stripped from the windings.

7. A machine of the type described comprising prongs adapted to be forced into the interstices of an armature winding to hold said winding, means adapted to engage the outer edges of said prongs to force said prongs into the interstices of said armature winding and a mandrel supported independent of said prongs adapted to force an armature body from the held windings.

In testimony whereof I affix my signature.

THOMAS S. WALLER.